US010593028B2

(12) United States Patent
Najaf-Zadeh et al.

(10) Patent No.: US 10,593,028 B2
(45) Date of Patent: Mar. 17, 2020

(54) METHOD AND APPARATUS FOR VIEW-DEPENDENT TONE MAPPING OF VIRTUAL REALITY IMAGES

(71) Applicant: Samsung Electronics Co., Ltd, Suwon-si (KR)

(72) Inventors: Hossein Najaf-Zadeh, Allen, TX (US); Madhukar Budagavi, Plano, TX (US); Ankur Saxena, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 15/255,129

(22) Filed: Sep. 1, 2016

(65) Prior Publication Data

US 2017/0161881 A1    Jun. 8, 2017

Related U.S. Application Data

(60) Provisional application No. 62/290,046, filed on Feb. 2, 2016, provisional application No. 62/262,434, filed on Dec. 3, 2015.

(51) Int. Cl.
*G06T 5/00*       (2006.01)
*G09G 5/14*       (2006.01)
(Continued)

(52) U.S. Cl.
CPC ............ *G06T 5/008* (2013.01); *G02B 27/017* (2013.01); *G06F 3/012* (2013.01); *G06T 15/205* (2013.01); *G06T 19/00* (2013.01); *G06T 19/006* (2013.01); *G09G 5/14* (2013.01); *H04N 19/46* (2014.11); *H04N 19/597* (2014.11); *H04N 21/47217* (2013.01); *H04N 21/816* (2013.01); *G02B 2027/014* (2013.01); *G02B 2027/0187* (2013.01); *G06T 2207/10024* (2013.01);
(Continued)

(58) Field of Classification Search
None
See application file for complete search history.

(56) References Cited

U.S. PATENT DOCUMENTS 5,818,964 A       10/1998    Itoh
2004/0001091 A1   1/2004     Kressin
(Continued)

FOREIGN PATENT DOCUMENTS

CN    101938605        1/2011
GB    2523555  A       9/2015
(Continued)

OTHER PUBLICATIONS

Okura, Fumio, Masayuki Kanbara, and Naokazu Yokoya. "Aerial full spherical HDR imaging and display." Virtual Reality 18.4 (Nov. 2014): 255-269. (Year: 2014).*
(Continued)

*Primary Examiner* — Kim Y Vu
*Assistant Examiner* — Nathan J Bloom

(57) ABSTRACT

A user equipment (UE) includes a receiver, at least one sensor, and a processor. The receiver is configured to receive a bit stream including at least one encoded image and metadata. The sensor is configured to determine viewpoint information of a user. The processor is configured to render the at least one encoded image based on the metadata and the viewpoint.

18 Claims, 9 Drawing Sheets

(51) Int. Cl.
*G06T 19/00* (2011.01)
*H04N 19/597* (2014.01)
*H04N 21/81* (2011.01)
*H04N 21/472* (2011.01)
*H04N 19/46* (2014.01)
*G02B 27/01* (2006.01)
*G06F 3/01* (2006.01)
*G06T 15/20* (2011.01)
*H04N 19/17* (2014.01)
*H04N 19/186* (2014.01)

(52) U.S. Cl.
CPC .............. *G06T 2207/20012* (2013.01); *G06T 2207/20208* (2013.01); *G09G 2340/06* (2013.01); *H04N 19/17* (2014.11); *H04N 19/186* (2014.11)

(56) References Cited

U.S. PATENT DOCUMENTS

| | | | |
|---|---|---|---|
| 2005/0008074 A1* | 1/2005 | van Beek | H04N 21/2365 375/240.01 |
| 2005/0285974 A1 | 12/2005 | Kim | |
| 2009/0027519 A1 | 1/2009 | Nishiwaki et al. | |
| 2011/0243473 A1 | 10/2011 | Chen et al. | |
| 2012/0105473 A1* | 5/2012 | Bar-Zeev | G02B 27/017 345/633 |
| 2012/0127284 A1* | 5/2012 | Bar-Zeev | G02B 27/017 348/53 |
| 2012/0242798 A1 | 9/2012 | Mcardle et al. | |
| 2013/0063561 A1* | 3/2013 | Stephan | H04N 13/026 348/46 |
| 2013/0215264 A1* | 8/2013 | Soatto | G06K 9/4671 348/143 |
| 2013/0300740 A1* | 11/2013 | Snyder | G06F 3/016 345/420 |
| 2014/0268356 A1 | 9/2014 | Bolas et al. | |
| 2015/0058102 A1* | 2/2015 | Christensen | G11B 27/11 705/14.6 |
| 2015/0201109 A1 | 7/2015 | Li | |
| 2016/0352791 A1* | 12/2016 | Adams | H04L 65/4069 |

FOREIGN PATENT DOCUMENTS

| | | |
|---|---|---|
| WO | 2014066887 A1 | 5/2014 |
| WO | WO2015097168 A1 | 7/2015 |
| WO | 2018/002882 A1 | 1/2018 |

OTHER PUBLICATIONS

Kang SB, Uyttendaele M, Winder S, Szeliski R (2003) High dynamic range video. ACM Trans Graph. (Proc. ACM SIG-GRAPH'03) 22(3):319-325 (Year: 2003).*

Specification of U.S. Appl. No. 62/167,260, filed May 27, 2015, which is the provisional priority document of Adams et al US 2016/0352791 (Year: 2015).*

Foreign Communication From a Related Counterpart Application, PCT Application No. PCT/KR2016/014093, International Search Report dated Mar. 13, 2017, 3 pages.

Foreign Communication From a Related Counterpart Application, PCT Application No. PCT/KR2016/014093, Written Opinion dated Mar. 13, 2017, 8 pages.

Supplementary European Search Report dated Feb. 22, 2019 in connection with European Patent Application No. 16 87 1075, 15 pages.

European Patent Office, "Supplementary Partial European Search Report," Application No. EP16871075.4, dated Nov. 19, 2018, 16 pages.

Budagavi, Madhukar, et al., "360 Degrees Video Coding Using Region Adaptive Smoothing," 2015 IEEE International Conference on Image Processing (ICIP), IEEE, Sep. 27-30, 2015, Quebec City, QC, Canada, 5 pages.

Mrak, Marta, et al., "An Overview of Basic Techniques Behind Scalable Video Coding," 46th International Symposium Electronics in Marine, ELMAR-2004, Jun. 16-18, 2004, Zadar, Croatia, 6 pages.

Oh, Sejin, et al. (LG Electronics), "Signaling of Static Metadata for VR Video in ISOBMFF," ISO/IEC JTC1/SC29/WG11 MPEG2016/m38948, Oct. 2016, Chengdu, China, 7 pages.

* cited by examiner

METHOD AND APPARATUS FOR VIEW-DEPENDENT TONE MAPPING OF VIRTUAL REALITY IMAGES

CROSS-REFERENCE TO RELATED APPLICATION(S) AND CLAIM OF PRIORITY

This application claims priority under 35 U.S.C. § 119(e) to U.S. Provisional Patent Application No. 62/290,046 filed on Feb. 2, 2016 and U.S. Provisional Patent Application No. 62/262,434 filed on Dec. 3, 2015. The above-identified provisional patent applications are hereby incorporated by reference in their entirety.

TECHNICAL FIELD

This disclosure relates generally to image enhancement. More specifically, this disclosure relates to a method and apparatus for view-dependent tone mapping of virtual reality images.

BACKGROUND

Currently, new High Dynamic range (HDR) cameras and displays are becoming prominent. HDR cameras can capture images having intensities that may range from 0.01 to around 10,000 nits. While studios are primarily creating HDR content, due to the high cost of the HDR cameras and displays, they have not yet reached normal consumers.

Furthermore, most consumers still have SDR displays. It is also expected that the HDR displays will be considerably expensive than the SDR displays for a long time, and the normal consumer will only have access to SDR displays.

SUMMARY

This disclosure provides a method and apparatus for view-dependent tone mapping of virtual reality images.

In a first embodiment, a user equipment (UE) includes a receiver, at least one sensor, and a processor. The receiver is configured to receive a bit stream including at least one encoded image and metadata. The sensor is configured to determine viewpoint information of a user. The processor is configured to render the at least one encoded image based on the metadata and the viewpoint.

In a second embodiment, a method provides for rendering media in user equipment (UE). The method includes determining a viewport based on an orientation of the UE, deriving an overall tone mapping function corresponding to a portion of the media defined by the viewport, and rendering the portion of the media based on the tone mapping function.

In a third embodiment, a non-transitory computer readable medium embodying a computer program is provided. The computer program includes computer readable program code that when executed causes at least one processing device to determine a viewport based on an orientation of a user equipment (UE), derive an overall tone mapping function corresponding to a portion of media received by the UE and defined by the viewport, and render the portion of the media based on the tone mapping function.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
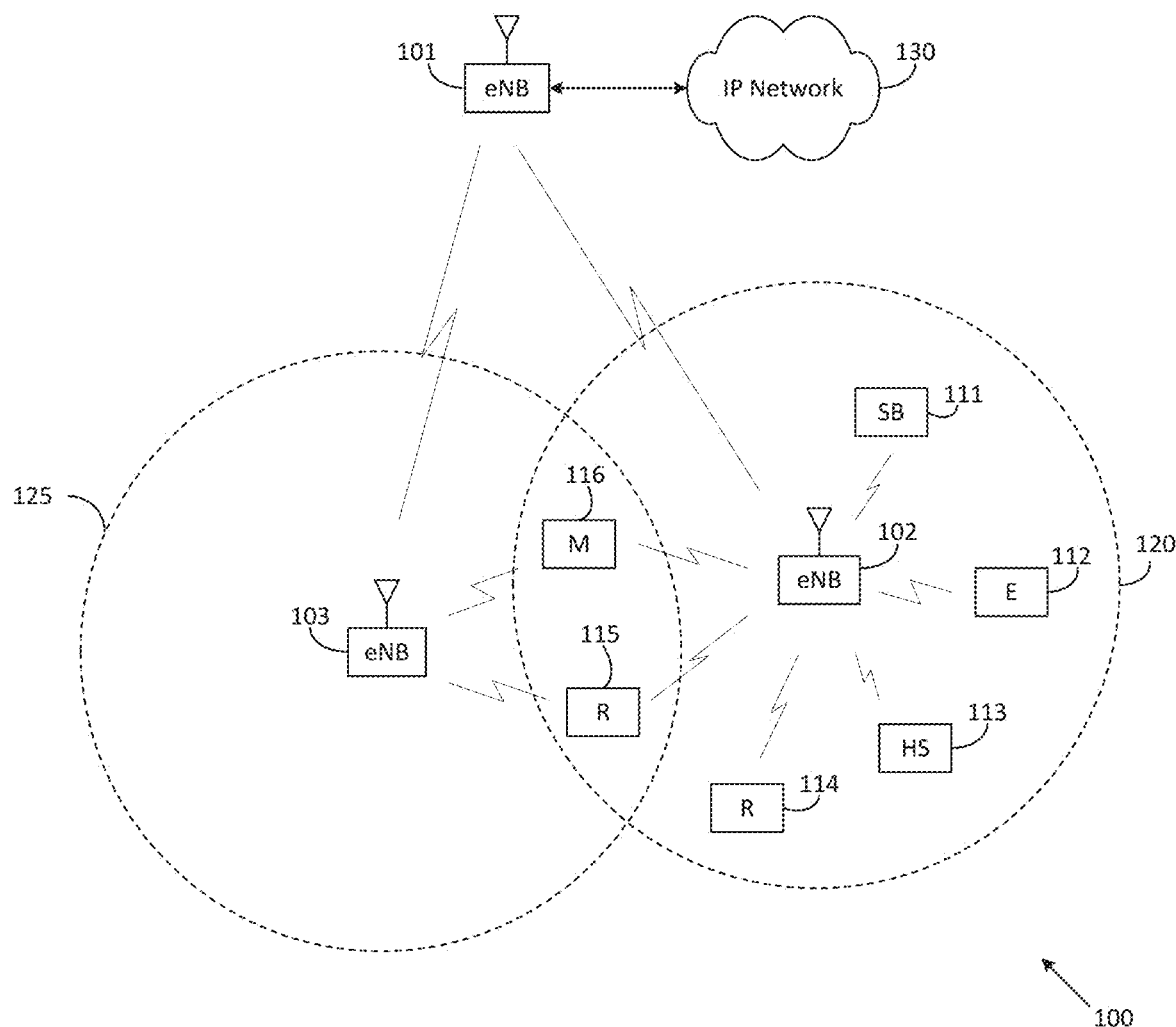
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," "television" or "user device." For the sake of convenience, the terms "user equipment" and "UE" are used in this patent document to refer to a television, display, monitor, or other such wired or wireless devices. The UE can be in communication with another UE, such as a mobile device, or other television.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

One or more embodiments of this disclosure provide methods and apparatuses to performing post-processing of HDR content to display HDR content on SDR displays. In one example, the HDR contents is transformed to a lower dynamic range. As used herein, one or more embodiments of this disclosure refers to an SDR or HDR image. However, different embodiments of this disclosure can also be used with video. When referencing an image herein, whether SDR or HDR, the different embodiments of this disclosure could be referring to a frame within a video for a given frame rate (number of pictures per unit of time).

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
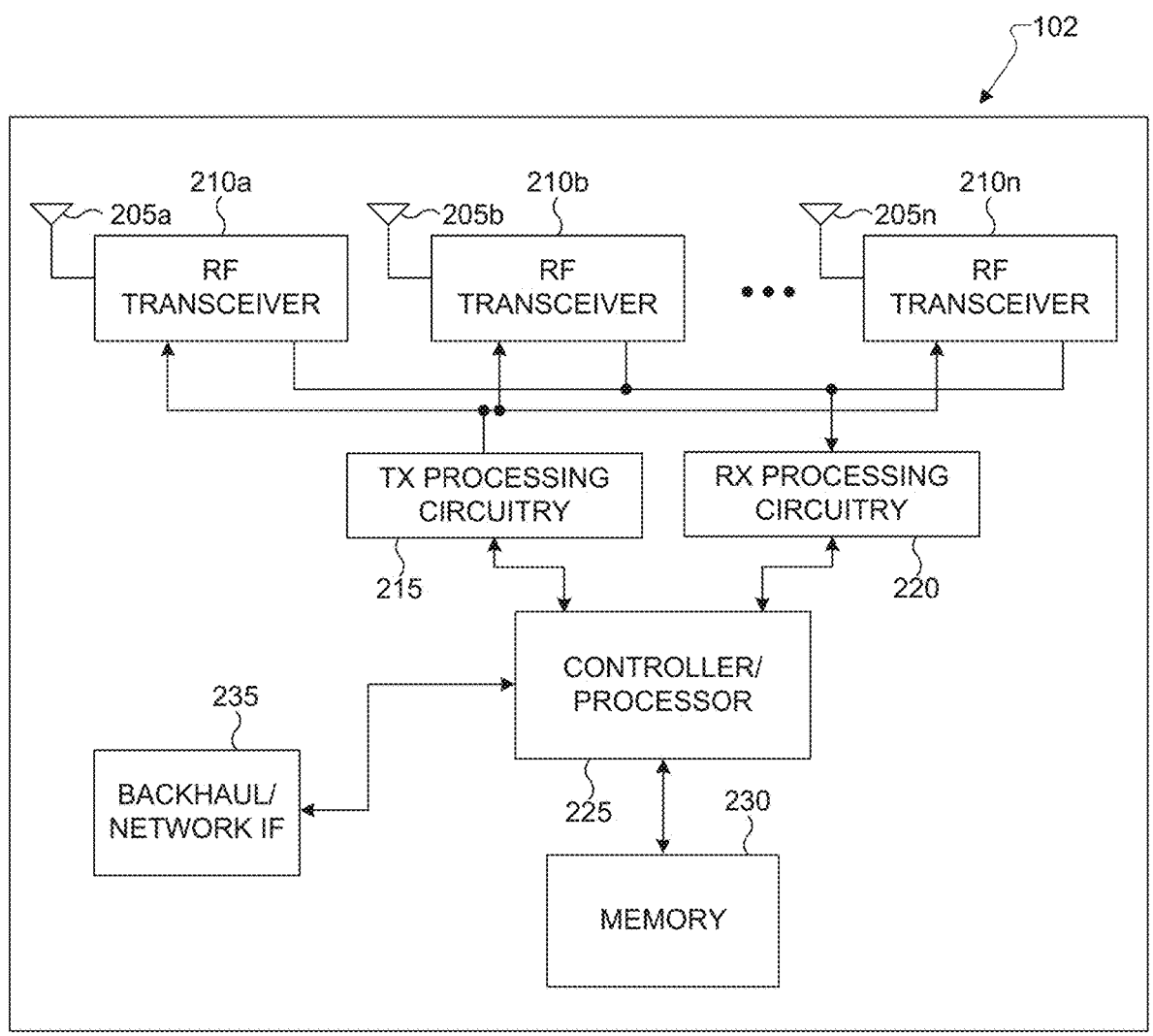
FIG. 2 illustrates an example eNodeB (eNB) according to this disclosure.

FIG. 2 illustrates an example eNB 102 according to this disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver or receiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
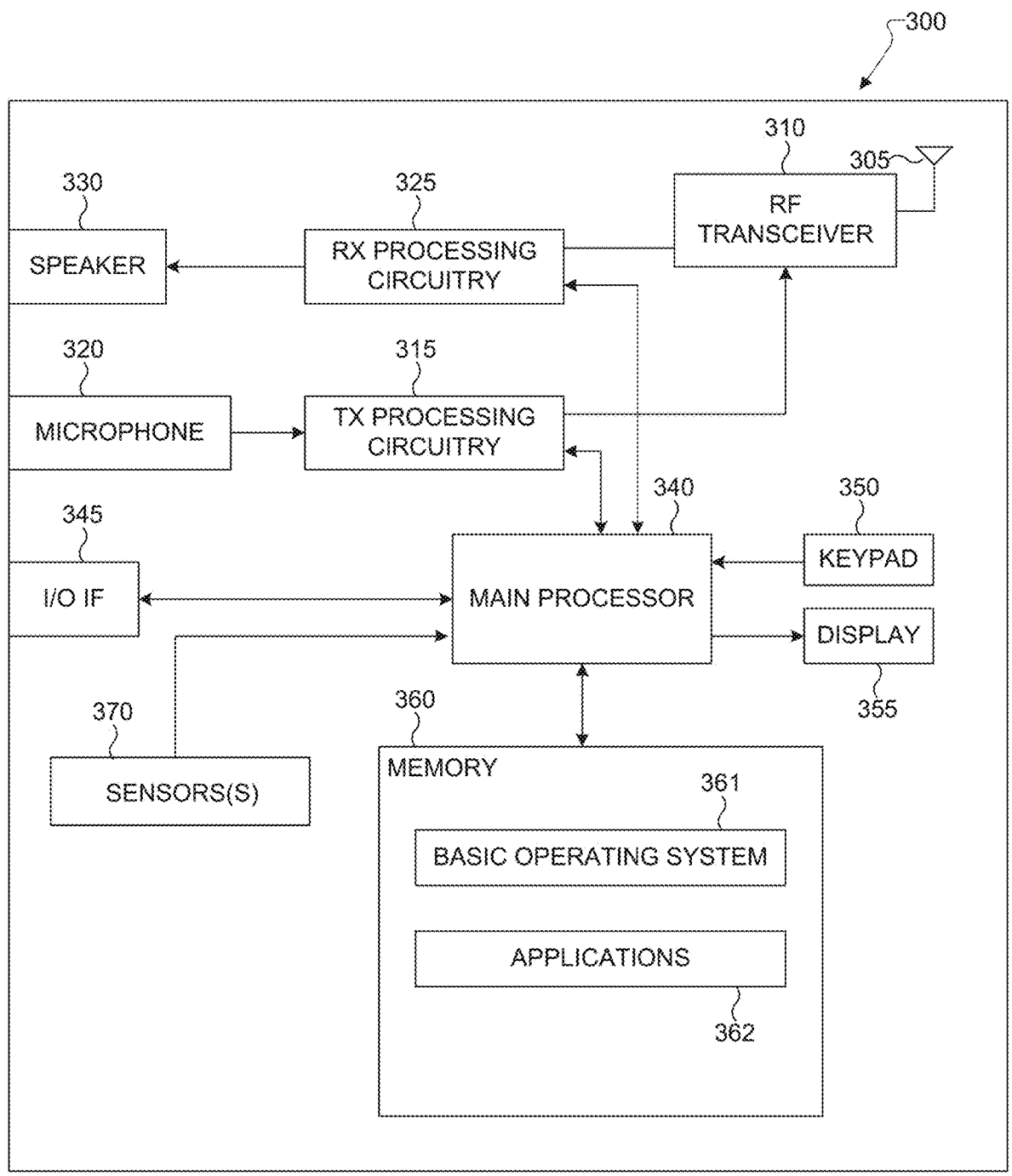
FIG. 3 illustrates an example head mounted display (HMD) according to this disclosure.

FIG. 3 illustrates an example head mounted display (HMD) 300 according to this disclosure. The embodiment of the HMD 300 illustrated in FIG. 3 is for illustration only, and any of the UEs 111-116 of FIG. 1 could have the same or similar configuration. However, HMDs come in a wide variety of configurations, and FIG. 3 does not limit the scope of this disclosure to any particular implementation of a HMD. In one or more embodiments of this disclosure, the HMD 300 may be replaced by a television.

As shown in FIG. 3, the HMD 300 includes an antenna 305, a radio frequency (RF) transceiver 310, transmit (TX) processing circuitry 315, a microphone 320, and receive (RX) processing circuitry 325. The HMD 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 or receiver receives, from the antenna 305, an incoming RF signal transmitted by an eNB of the network 100. The RF transceiver 310 or receiver down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the HMD 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the HMD 300 with the ability to connect to other devices such as laptop computers and handheld computers. The I/O interface 345 is the communication path between these accessories and the main processor 340.

The main processor 340 is also coupled to the keypad 350 and the display unit 355. The operator of the HMD 300 can use the keypad 350 to enter data into the HMD 300. The display 355 may be a liquid crystal display or other display capable of rendering text and/or at least limited graphics, such as from web sites. In one embodiment, the keypad 350 could also be a touchscreen. The touchscreen could include a touch panel, a (digital) pen sensor, a key, or an ultrasonic input device. The touchscreen could recognize, for example, a touch input in at least one scheme among a capacitive scheme, a pressure sensitive scheme, an infrared scheme, or an ultrasonic scheme. The touchscreen could also include a control circuit. In the capacitive scheme, the touchscreen could recognize touch or proximity.

The memory 360 is coupled to the main processor 340. Part of the memory 360 could include a random access memory (RAM), and another part of the memory 360 could include a Flash memory or other read-only memory (ROM).

HMD 300 further includes one or more sensors 370 that can meter a physical quantity or detect an activation state of the HMD 300 and convert metered or detected information into an electrical signal. For example, sensor 370 may include one or more buttons for touch input, e.g., on the headset or the HMD 300, a camera, a gesture sensor, a gyroscope or gyro sensor, an air pressure sensor, a magnetic sensor or magnetometer, an acceleration sensor or accelerometer, a grip sensor, a proximity sensor, a color sensor (e.g., a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 370 can further include a control circuit for controlling at least one of the sensors included therein. As will be discussed in greater detail below, one or more of these sensor(s) 370 may be used to control a UI, detect UI inputs, determine the orientation and facing direction of the user for 3D content display identification, etc. Any of these sensor(s) 370 may be located within the HMD 300, within a headset configured to hold the HMD 300, or in both the headset and HMD 300, for example, in embodiments where the HMD 300 includes a headset.

Although FIG. 3 illustrates one example of HMD 300, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices. In another example embodiment, when UE 116 is a television, the UE 116 may not include a transceiver, keypad, or microphone. The UE 116 may include a receiver or decoder without a transmitter or encoder.

Figure 4:
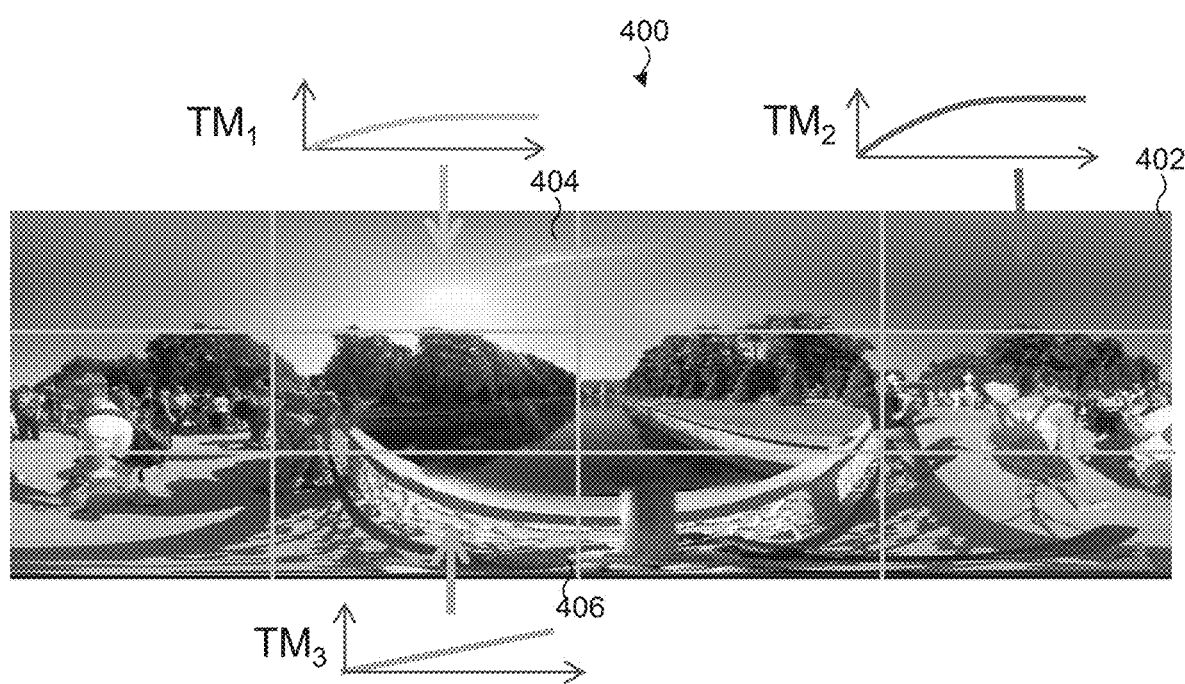
FIG. 4 illustrates an example segmented image according to an embodiment of this disclosure.

FIG. 4 illustrates an example segmented image according to an embodiment of this disclosure. As shown in FIG. 4, image 400 represents a panoramic view of a three hundred sixty degree (360°) HDR image that may be captured by an HDR camera (not shown). As will be discussed below, the image 400 is segmented into different segments. For example, image 400 is segmented into twelve (12) segments of equal size. In other embodiments, any number of segments may be used and the size of each segment may be fixed or variable depending on the image.

Image 400 has a high dynamic range between dark regions, e.g., segment 402, and light regions, e.g., segment 404. In order to display image 400 on a device, such as HMD 300, the image 400 may need to be down converted to match the properties of the device. As shown in FIG. 4, each segment 402, 404, and 406 has a specific tone mapping function assigned thereto that may be used to down convert the image.

Figure 5:
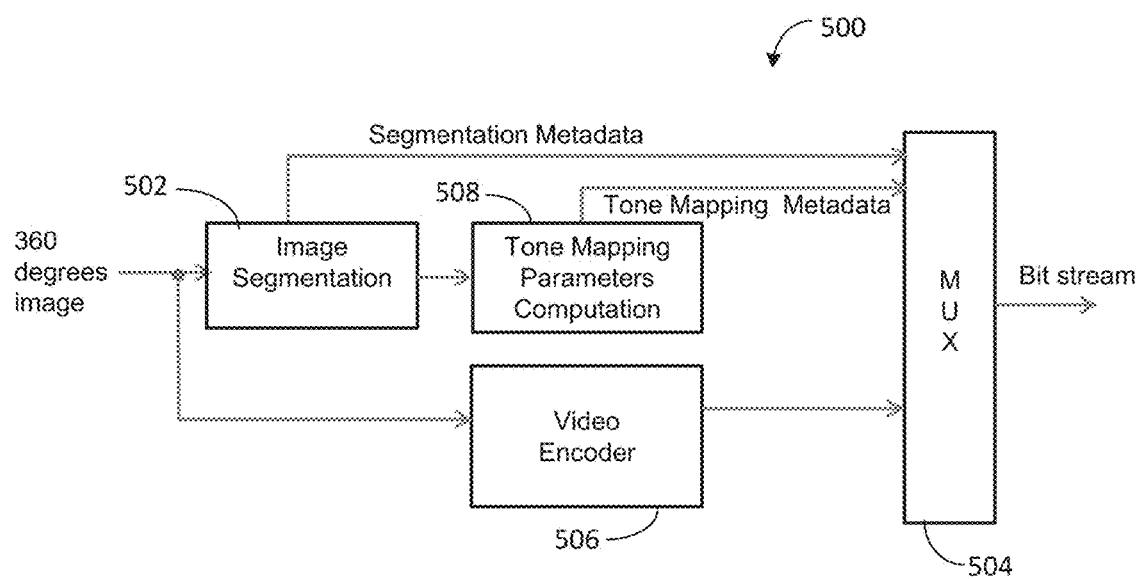
FIG. 5 illustrates a system for encoding an image according to an embodiment of this disclosure.

FIG. 5 illustrates a system 500 for encoding an image according to an embodiment of this disclosure. As shown in FIG. 5, a 360° image is provided to an image segmentation module 502. Image segmentation module 502 divides the image into a plurality of segments. The size of each segment may be fixed as shown in FIG. 4 or the image segmentation module 502 may segment the image according to intelligent segmenting. For instance, if there is sky region that covers the whole of the top view, one could create a single segment for the whole of sky region and use a single HDR metadata for the whole region instead of using multiple HDR metadata if the region were uniformly divided. Any technique for intelligent segmentation can be used such as Otsu's method, K-mean clustering, watershed algorithm, texture filters, etc.

Image segmentation module 502 provides segmentation metadata to a multiplexer 504. Segmentation metadata may include, but is not limited to, the parameters shown in Table 1 below.

TABLE 1

| Parameter | Description |
| --- | --- |
| SegmentSize | The SegmentSize shall be a pair of integers, where the first integer shall be the size of a segment along the x axis in amount of pixels (i.e. segment width), and the second number shall be the size of a segment along the y axis in amount of pixels (i.e. segment height). The first number of the SegmentSize shall be in range [1, ImageWidth], and the second number of the SegmentSize shall be in the range [1, ImageHeight]. |
| Percentage of Segmental MaxRGB | The PercentSegMaxRGB shall be an integer in the range [0, 100]. |
| Segmental Percentile MaxRGB | The SegPercentileMaxRGB shall be a matrix with the size floor(ImageWidth/segment width) × floor(ImageHeight/segment height), wherein each element of the SegPercentileMaxRGB shall be a smoothed linearized maxRGB value greater than or equal to PercentSegMaxRGB percent of the smoothed linearized maxRGB values in the corresponding segment. The SegPercentileMaxRGB shall be in the range [0, 1], where 0 shall correspond to 0 cd/m2 and 1 shall correspond to 10000 cd/m2. |
| Temporal Smoothing Weight | The TempSmoothWeight shall be a decimal number which determines the amount of temporal smoothing of the segmental percentile MaxRGB values. The TempSmoothWeight shall be in the range [0, 1] |

The segmented image is provided to a tone mapping parameter computation module 508 that determines a tone mapping function for each segment as shown in FIG. 4. The tone mapping function applied to each segment is based on the peak luminance of the segment. The tone mapping parameter computation module 08 provides the tone mapping function as metadata to multiplexer 504.

Video encoder 506 also encodes the 360° image using know video encoding techniques and provides the encoded 360° video to the multiplexer 504. The multiplexer 504 then multiplexes the encoded video, the segmentation metadata, and the tone mapping metadata into a bit stream that may be transmitted to any of the user equipment 111-116 as shown in FIG. 1.

Figure 6:
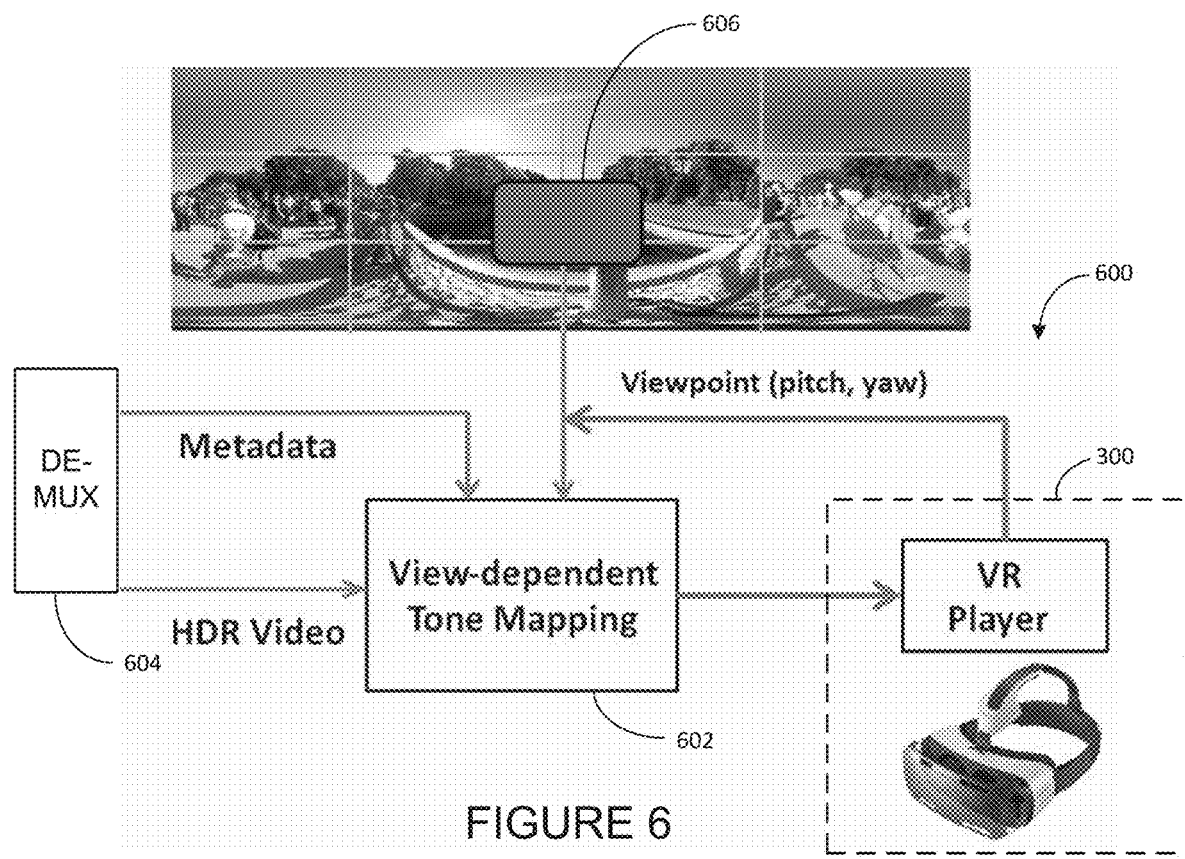
FIG. 6 illustrates a system for rendering an image according to an embodiment of this disclosure.

FIG. 6 illustrates a system 600 for rendering an image according to an embodiment of this disclosure using, for example, an HMD 300 as shown in FIG. 3. Although, the system of FIG. 6 will be described by referencing the HMD 300 of FIG. 3, the system 600 may be incorporated into any other device suitable for displaying a portion of a 360° image or video, such as a television.

As shown in FIG. 6, HMD 300 provides viewpoint information to a view-dependent tone mapping module 602 that may be implemented by one or more processors (e.g., main processor 340). The view point information includes a pitch and yaw determined by one or more sensors 370 and is used to define a viewport 606 to be displayed to a user. A demultiplexer 604 demultiplexes an incoming bit stream that includes encoded images and/or video and the segmentation and tone mapping metadata. The demultiplexer 604 provides the encoded images and/or video and the metadata to the view-dependent tone mapping module 602. Based on the viewpoint information, the view-dependent tone mapping module 602 select a segment to be displayed on the HMD 300 and applies the tone mapping function corresponding to the segment in order to down convert the displayed segment to match the properties of the HMD 300. In some embodiments, the viewport may include multiple segments. When the view port includes multiple segments, the tone mapping functions of each segment are averaged and applied to the portion of the image corresponding to the viewport.

Figure 7:
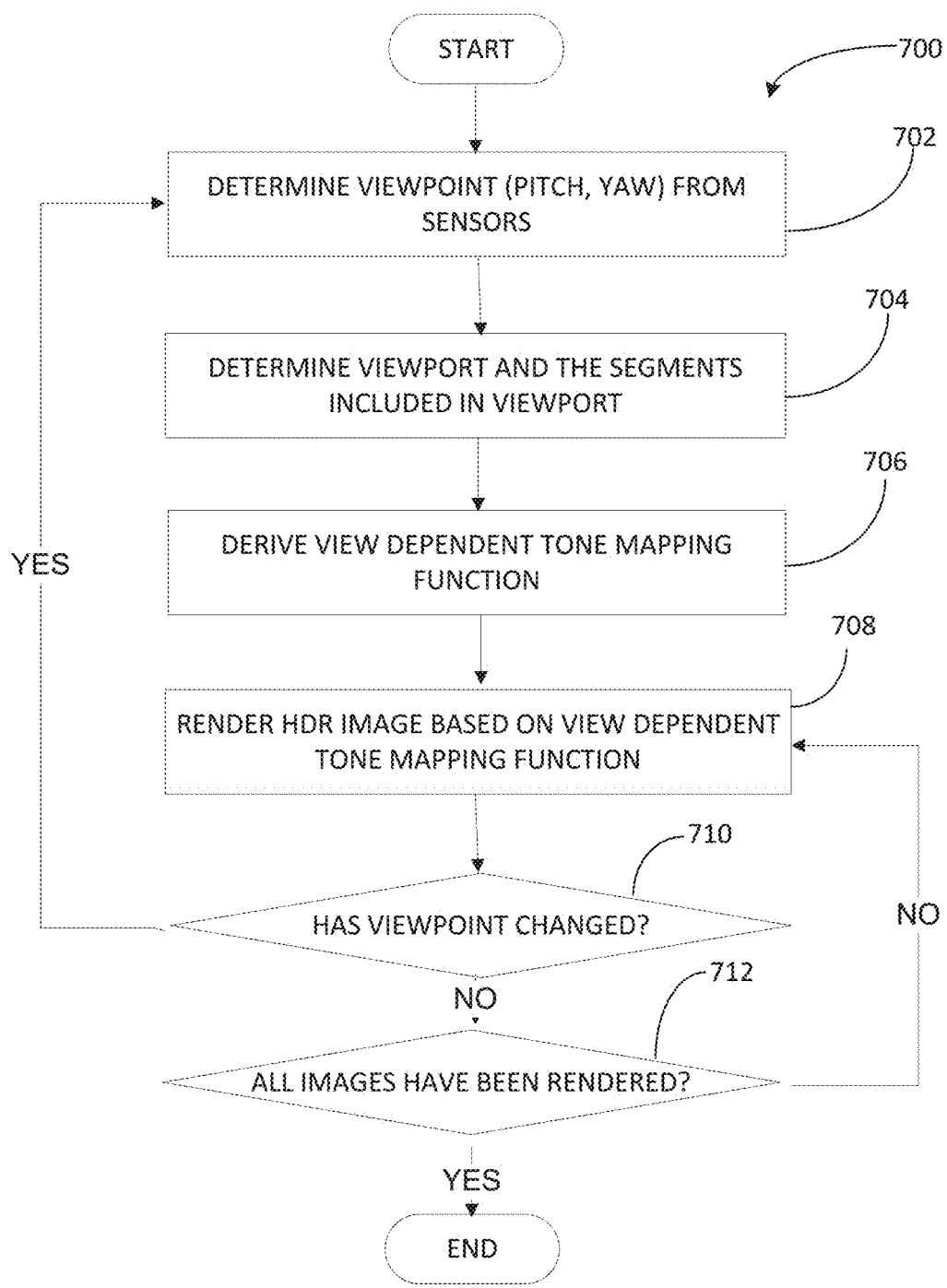
FIG. 7 illustrates a flowchart for rendering a portion of a virtual reality image based on tone mapping according to an embodiment of this disclosure.

FIG. 7 illustrates a flowchart of a method 700 for rendering a portion of a virtual reality image based on tone mapping according to an embodiment of this disclosure. For ease of explanation, FIG. 7 will be described in conjunction with HMD 300 of FIG. 3 and system 600 of FIG. 6. Method 700 begins in process 702 where a user's viewpoint is determined based on a pitch and yaw provided by the one or more sensors 370. Based on the viewpoint, the HMD 300 determine a viewport and the segments included in the viewport in process 704. In process 706, the dependent tone mapping module 602 derives a view dependent tone mapping function based on the tone mapping function of each segment included in the viewport. Using the derived tone mapping function, the HMD 300 renders at least a portion of the HDR image corresponding to the viewport and the derived tone mapping function in process 708. In process 710, the HMD determines if the user's viewpoint has changed. If the user's viewpoint has changed, the method returns to process 702. If the user's viewpoint has not changed, the method proceeds to process 712 where a determination is made as to whether all images or frames have been rendered. If all images or frames are not rendered, the method returns to process 708. Otherwise, the method is completed.

Figure 8:
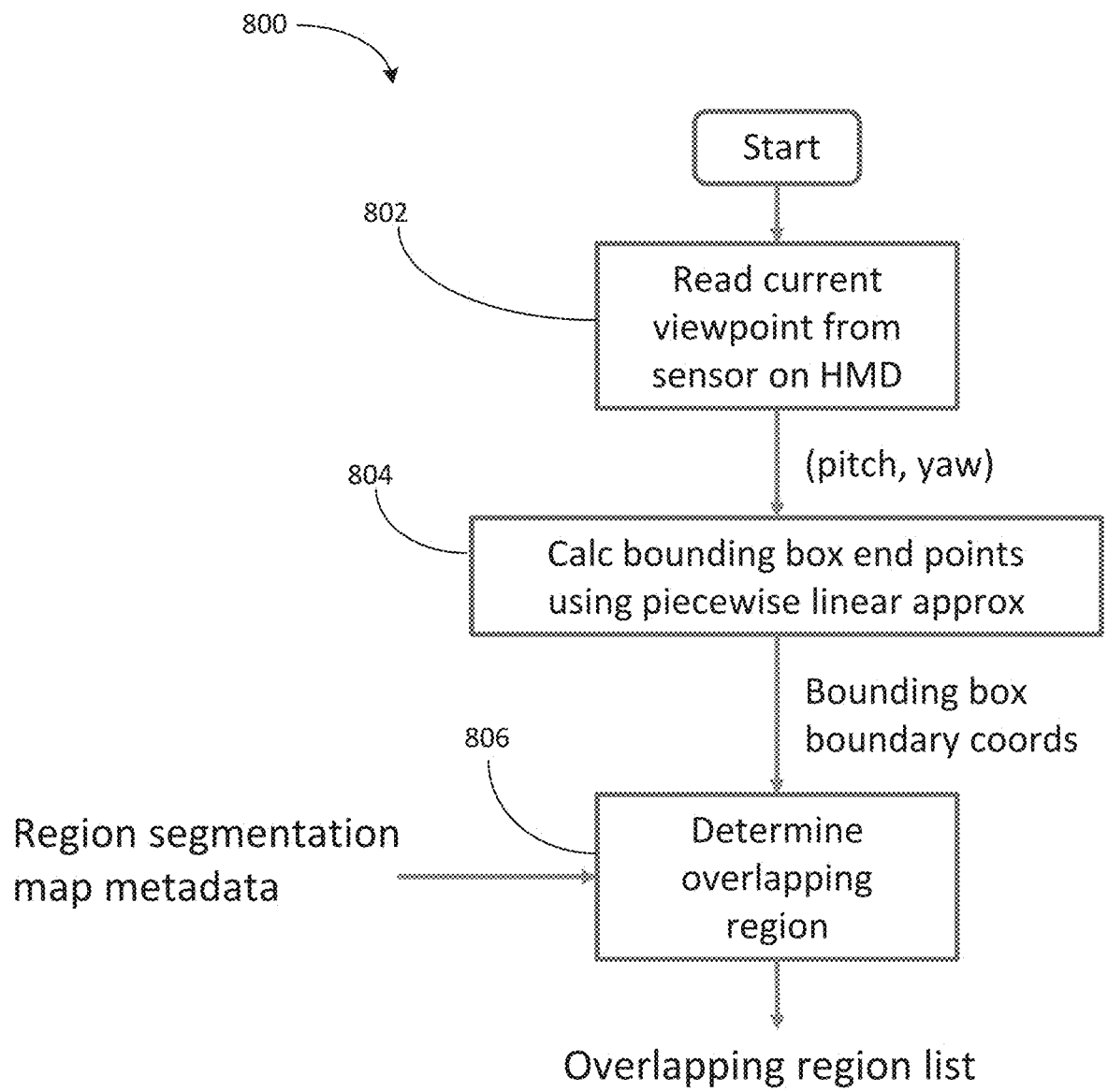
FIG. 8 illustrates a flowchart for determining a user viewport according to an embodiment of this disclosure
Figure 9:
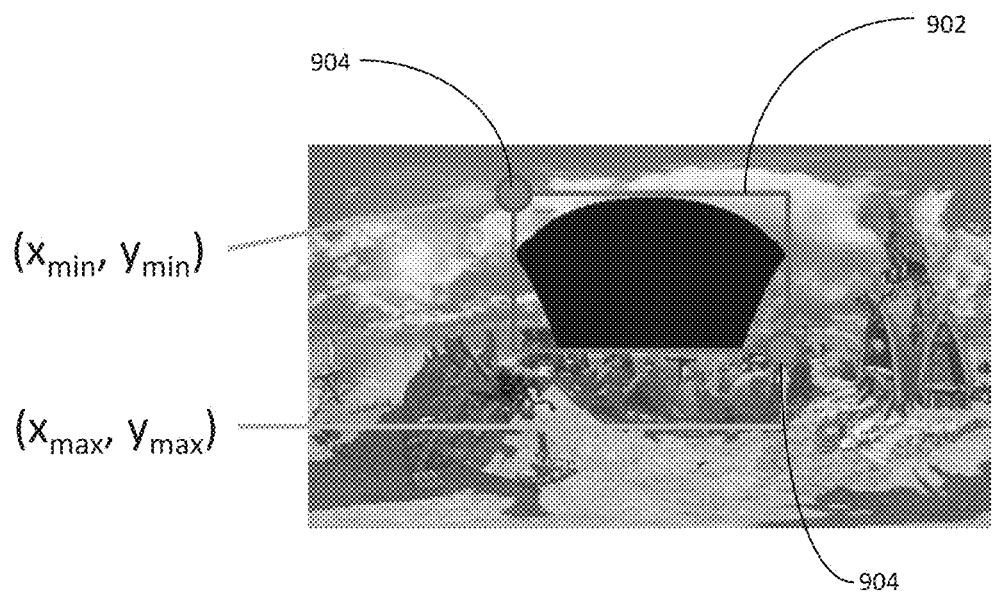
FIG. 9 illustrates an example viewport according to an embodiment of this disclosure.
Figure 10:
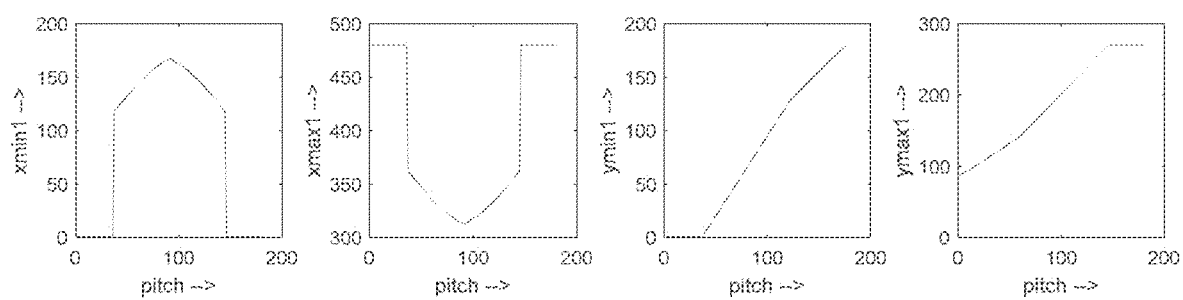
FIG. 10 illustrates example charts for defining a bounding box according to an embodiment of this disclosure.

FIG. 8 illustrates a flowchart of a method 800 for determining a user viewport according to an embodiment of this disclosure. FIG. 9 illustrates an example viewport according to an embodiment of this disclosure. FIG. 10 illustrates example charts for defining a bounding box according to an embodiment of this disclosure.

As shown in FIG. 9, in process 802, the user's viewpoint is determined from HMD 300 using one or more sensors 370. The HMD 300 then provides the pitch and yaw components of the viewpoint to calculate bounding box endpoints 904 of a bounding box 902 as shown in FIG. 9 using piecewise linear approximation in process 804. For example, FIG. 10 shows an example of the function used to calculate the bounding box endpoints 904 based on the user's viewpoint. In process 806, an overlapping region list is determined based on the segments that overlap the bounding box 902 using the segmentation metadata. The overlapping region list is then used to derive the tone mapping function that would be applied to the viewport.

Figure 11:
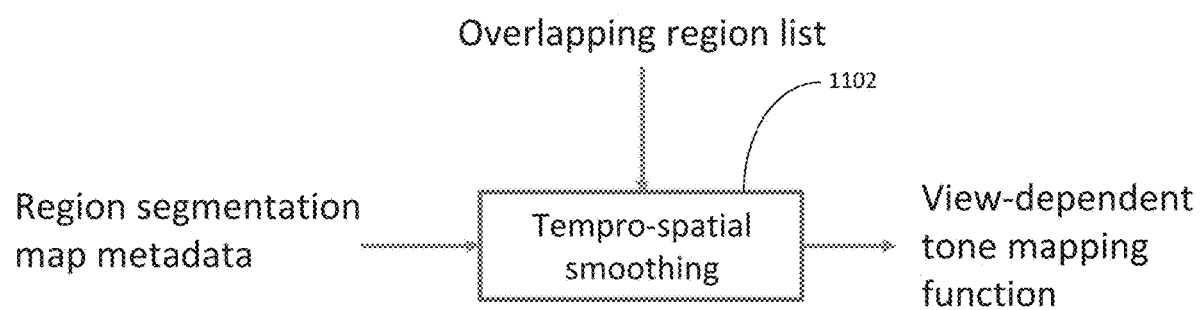
FIG. 11 illustrates a system block diagram of a smoothing process applied to the HDR images.

FIG. 11 illustrates a system block diagram of a smoothing process applied to the HDR images. As shown in FIG. 11, a tempro-spatial smoothing process 1102 is applied before deriving the view dependent tone mapping function. The tempro-spatial smoothing process 1102 is based on the overlapping region list and the segmentation metadata.

Large fluctuations in peak luminance across segments may lead to remarkably different tone mapping functions that might lead to flickering artifacts. To avoid large variations in tone mapping functions, the peak luminance across segments is spatially smoothed by the following 2D low-pass filter:

$$F = \frac{1}{2N_{ns}}\begin{pmatrix} 1 & 1 & 1 \\ 1 & N_{ns} & 1 \\ 1 & 1 & 1 \end{pmatrix}$$

where $N_{ns}$ denotes the number of neighboring segments surrounding a segment. If $N_{ns}$ is less than 8 (e.g., segments in the corners or at the boundaries of the image), overlapping parts of the filter with the image may be used for smoothing.

Further, in order to avoid flickering, segmental peak luminance may also be temporally smoothed. The smoothing operation is performed according to Equation 1 as follows:

$$L_{st,i,k} = wL_{st,i,k-1} + (1-w)L_{s,i,k}, \quad \text{(Eq. 1)}$$

where $L_{s,i,k}$ is the spatially smoothed segmental peak luminance in segment i in the current frame, $L_{st,i,k-1}$ is the tempro-spatially smoothed segmental peak luminance in segment i in the previous frame, $L_{st,i,k}$ is the tempro-spatially smoothed segmental peak luminance in segment i in the current frame, and w is the temporal smoothing weight in the range [0,1]. The temporal smoothing weight may determine the amount of smoothing of segmental peak luminance in time. The larger the value of w, the less flickering in the output video at the cost of less locality of adaptive tone mapping. In the current implementation w may be set to 0.5.

To reduce the impact of a few very bright pixels, segmental peak luminance in each segment is calculated based on the p-percentile maxRGB in each segment wherein p % of the maxRGB values of the pixels in the segment will be less than the segmental peak luminance. In the proposed embodiment, may be set to 99%.

When the user's viewport overlaps more than one segment, the peak luminance in the viewport may be calculated through weighted averaging the segmental peak luminance in the segments overlapping the viewport according to Equation 2 as follows $$L_{vp} = \sum_{i=1}^{N_s} \frac{c(i)}{N_{vp}} L_{st,i} \quad \text{(Eq. 2)}$$

where $L_{vp}$ is the peak luminance in the user's viewport, $N_s$ is the number of segments, c(i) is the number of pixels in the overlapping part of the viewport and segment i, $L_{st,i}$ is the tempro-spatially smoothed segmental peak luminance in segment i, and $N_{vp}$ is the number of pixels in the viewport.

Although the figures illustrate different examples of devices, various changes may be made to the embodiments. For example, as described above, segmental peak luminance may be calculated for a fixed number of segments at the transmitter and transmitted as metadata to the receiver. In some embodiments, peak luminance may be calculated for any viewport at the HMD. This may require extra computation at the HMD, but would reduce the transmission bandwidth as there would be no need for segmental peak luminance metadata. For the latter method, pixels belonging to a set of viewports (i.e. different yaw and pitch) can also be pre-labeled to reduce computation at the decoder.

Further, in some embodiments, peak luminance may be calculated for different points of view (e.g., yaw and pitch values) instead of rectangular segments and metadata corresponding to these can be transmitted to the receiver. At the receiving end, depending on the viewer's viewpoint (i.e. yaw and pitch) the appropriate peak luminance can be directly used for tone mapping. The precision of this method may depend on the granularity of the yaw and pitch values.

In other embodiments, correlation in successive frames in video contents may be exploited to predict metadata of video frames (e.g. segmental peak luminance). This predictive coding may reduce transmission bandwidth and computation for the metadata.

In some embodiments, image segmentation may be made more efficient by using intelligent ways of image segmentation. For instance, if there is sky region that covers the whole of the top view, one could create a single segment for the whole of sky region and use a single HDR metadata for the whole region instead of using multiple HDR metadata if the region were uniformly divided. The cost associated with this approach would be to find optimal segmentation of the input image and then send information about the optimal segmentation map instead of information about a uniform grid. Any technique for intelligent segmentation can be used such as Otsu's method, K-mean clustering, watershed algorithm, texture filters etc.

In other embodiments, tone mapping design and image segmentation can be combined. In doing so, joint optimization is performed to find the optimal segmentation and corresponding tone mapping parameters according to Equation 3 as follows:

$$\Sigma_{k=1}^{N}\Sigma_{i=1}^{K}d(P_{ik},\Omega(P_{ik})) \quad \text{(Eq. 3)}$$

where N is the number of segments, K is the number of pixels in segment K, d( ) is the distortion function measuring the difference between HDR and SDR pixels, $P_{ik}$ is the i-th HDR pixel in segment k, $\Omega$( ) is the tone mapping function (represented by a set of parameters).

For the distortion function, an objective metric such as HDR-VDP2 may be used. The proposed optimization procedure is iterative, starting with some initial segmentation and tone mapping parameters and after a number of iteration, the optimal segmentation and tone mapping parameters may be found.

Because probabilities of viewpoints are different depending on scene statistics and the user preferences, in some embodiments, HDR metadata for the most commonly used view (i.e. default view) may be sent in addition to metadata for different image segments. If the default view gets used, the metadata can be used directly without any additional processing that would reduce complexity.

In some embodiments, the user's movement may be taken into consideration while calculating metadata for a current view. The user motion trajectory may be used to appropriately calculate or smooth the tone mapping parameters. If priority is given to the most recent previous temporal view, the tone mapping parameters for the current view can be smoothed as follows to avoid any undesirable flicker in the displayed video according to Equation 4 as follows:

$$\tilde{\Omega}_t = (1-\alpha)\tilde{\Omega}_{t-1} + \alpha\Omega_t \quad \text{(Eq. 4)}$$

where $\Omega_t$ is the tone mapping parameters for the current view, $\tilde{\Omega}_{t-1}$ is the smoothed tone mapping parameters for the previous view, $\tilde{\Omega}_t$ is the smoothed tone mapping parameters for the current view, and $\alpha$ is the forgetting factor in the range of [0, 1], wherein a value of zero means no smoothing.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE), comprising:
   at least one orientation sensor configured to determine viewpoint information of a user; and
   a computer processor configured to:
      receive a bit stream including at least one encoded image and metadata,
      decode the bit stream into a decoded image and the metadata, the decoded image segmented into multiple segments indicated by the metadata,
      determine a portion of the decoded image corresponding to a viewport indicated by the viewpoint information,
      identify segments, of the multiple segments, that are included in the viewport,
      derive a tone mapping function for the viewport that is associated with the segments that are included in the viewport, the tone mapping function based on the metadata corresponding to the segments,
      identify a weighted average of peak luminance based on portions of the segments that are included in the viewport,
      apply the tone mapping function based on the weighted average of the peak luminance to the portion of the decoded image that corresponds to the viewport, and
      render the portion of the decoded image.

2. The UE of claim 1, wherein the encoded image includes the multiple segments, each segment of the multiple segments is identified by segmentation metadata.

3. The UE of claim 2, wherein the metadata includes the segmentation metadata and tone mapping metadata, the tone mapping metadata represents at least one tone mapping function based on peak luminance for each segment of the multiple segments.

4. The UE of claim 2, wherein a size of each segment of the multiple segments is the same.

5. The UE of claim 2, wherein a size of each segment of the multiple segments is variable.

6. The UE of claim 1, wherein the viewpoint information includes pitch information and yaw information.

7. The UE of claim 6, wherein the computer processor is configured to determine the viewport based on the pitch information and the yaw information.

8. The UE of claim 1, wherein the UE is a head mounted display.

9. A method for rendering media in user equipment (UE), the method comprising:
receiving a bit stream including at least one encoded image and metadata;
decoding the bit stream into a decoded image and the metadata, the decoded segmented into multiple segments indicated by the metadata;
determining a viewport based on an orientation of the UE;
determining a portion of the decoded image corresponding to the viewport;
identify segments, of the multiple segments, that are included in the viewport;
deriving a tone mapping function for the viewport that is associated with the segments that are included in the viewport, the tone mapping function based on the metadata corresponding to segments;
identifying a weighted average of peak luminance based on portions of the segments that are included in the viewport;
applying the tone mapping function based on the weighted average of the peak luminance to the decoded image that corresponds to the viewport; and
rendering the portion of the decoded image.

10. The method of claim 9, wherein determining the viewport includes:
receiving pitch information and yaw information from one or more sensors in the UE; and
calculating a bounding box based on the pitch information and the yaw information.

11. The method of claim 9, wherein:
the at least one encoded image includes the multiple segments, and
deriving the tone mapping function comprises:
determining a number of segments included in the viewport;
determining a plurality of tone mapping functions, each tone mapping function corresponds to one segment included in the viewport; and
averaging the plurality of tone mapping functions.

12. The method of claim 9, wherein the at least one encoded image is a video comprising a plurality of frames.

13. The method of claim 12, wherein the method further comprises applying spatial smoothing to each frame among the plurality of frames.

14. The method of claim 12, wherein the method further comprises applying temporal smoothing to each frame among the plurality of frames.

15. A non-transitory computer readable medium embodying a computer program, the computer program comprising computer readable program code that when executed causes at least one processing device to:
receive a bit stream including at least one encoded image and metadata;
decode the bit stream into a decoded image and the metadata, the decoded image segmented into multiple segments indicated by the metadata;
determine a viewport based on an orientation of a user equipment (UE);
determine a portion of the decoded image corresponding to the viewport;
identify segments, of the multiple segments, that are included in the viewport;
derive a tone mapping function for the viewport that is associated with the segments that are included in the viewport, the tone mapping function based on the metadata corresponding to the segments;
identify a weighted average of peak luminance based on portions of the segments that are included in the viewport;
applying the tone mapping function based on the weighted average of the peak luminance to the decoded image that corresponds to the viewport; and
render the portion of the decoded image.

16. The non-transitory computer readable medium of claim 15, wherein to determine the viewport, the computer program comprising computer readable program code that when executed causes at least one processing device to:
receive pitch information and yaw information from one or more sensors in the UE; and
calculate a bounding box based on the pitch information and the yaw information.

17. The non-transitory computer readable medium of claim 15, wherein:
the at least one encoded image includes the multiple segments, and
to derive the tone mapping function, the computer program comprising computer readable program code that when executed causes at least one processing device to:
determine a number of segments included in the viewport;
determine a plurality of tone mapping functions, each tone mapping function corresponds to one segment included in the viewport; and
average the plurality of tone mapping functions.

18. The non-transitory computer readable medium of claim 15, wherein the at least one encoded image is a 360° video.

* * * * *